(12) United States Patent
Koshikawa et al.

(10) Patent No.: US 6,990,711 B2
(45) Date of Patent: Jan. 31, 2006

(54) HINGE DEVICE AND CELL PHONE

(75) Inventors: Shinichiro Koshikawa, Yokaichiba (JP); Kazuyuki Ishigaya, Yokoshiba-machi (JP)

(73) Assignee: Sugatsune Kogyo Co., Ltd., (JP)

( * ) Notice: Subject to any disclaimer, the term of this patent is extended or adjusted under 35 U.S.C. 154(b) by 0 days.

(21) Appl. No.: 10/221,810

(22) PCT Filed: Nov. 28, 2001

(86) PCT No.: PCT/JP01/10371

§ 371 (c)(1),
(2), (4) Date: Sep. 16, 2002

(87) PCT Pub. No.: WO02/48558

PCT Pub. Date: Jun. 20, 2002

(65) Prior Publication Data

US 2003/0056325 A1    Mar. 27, 2003

(30) Foreign Application Priority Data

Dec. 14, 2000  (JP) .......................... 2000-379705

(51) Int. Cl.
 *E05D 11/10*  (2006.01)
(52) U.S. Cl. .................... 16/334; 455/550; 361/433.13
(58) Field of Classification Search ................. 16/338, 16/334, 330, 303, 329; 379/433.11–433.13; 361/680–682, 610; 455/550, 90, 556, 575
See application file for complete search history.

(56) References Cited

U.S. PATENT DOCUMENTS

| 5,628,089 | A | * | 5/1997 | Wilcox et al. | ................. 16/303 |
| 5,697,124 | A | * | 12/1997 | Jung | ........................... 16/341 |
| 5,704,094 | A | * | 1/1998 | Hartigan et al. | ............... 16/303 |
| 5,724,683 | A | * | 3/1998 | Sorimachi et al. | ............. 4/248 |
| 5,905,796 | A | * | 5/1999 | Jung | ..................... 379/433.13 |
| 5,923,751 | A | * | 7/1999 | Ohtsuka et al. | ........ 379/433.13 |
| 5,996,178 | A | * | 12/1999 | Murray | ........................ 16/303 |
| 6,115,886 | A | * | 9/2000 | Fujita | ........................... 16/330 |
| 6,125,507 | A | * | 10/2000 | Katoh | ......................... 16/329 |
| 6,148,480 | A | * | 11/2000 | Cooke | ......................... 16/303 |
| 6,175,990 | B1 | * | 1/2001 | Kato et al. | .................... 16/334 |

(Continued)

FOREIGN PATENT DOCUMENTS

DE    4032283    4/1992

(Continued)

*Primary Examiner*—J. J. Swann
*Assistant Examiner*—Andre L. Jackson
(74) *Attorney, Agent, or Firm*—Brown & Michaels, PC; Eugene S. Stephens & Associates

(57)  ABSTRACT

A movable member 6 is connected to a first hinge member 2 such that the movable member 6 is unable to turn but able to move in the axial direction. A hammer member 7 is non-turnably connected to a second hinge member 3. The movable member 6 is caused to abutted against the hammer member 7 by a coiled spring (not shown). A force conversion mechanism (not shown) is disposed between contact surfaces of the movable member 6 and hammer member 7 and adapted to convert a biasing force of the coiled spring to a force for turning the hammer member 7. An abutment projection 32 is formed on an outer periphery of the second hinge member 3. An abutment recess 71 into which the abutment projection 32 is fitted is formed in an outer periphery of the hammer member 71. A width 2 of the abutment recess 71 is set slightly larger than a width W1 of the abutment projection 32 so that the hammer member 7 can be turned relative to the second hinge member 3 to that extent.

2 Claims, 9 Drawing Sheets

U.S. PATENT DOCUMENTS

| | | | |
|---|---|---|---|
| 6,195,431 B1 * | 2/2001 | Middleton | 379/433.13 |
| 6,292,980 B1 * | 9/2001 | Yi et al. | 16/303 |
| 6,305,050 B1 * | 10/2001 | Imai | 16/303 |
| 6,321,415 B1 * | 11/2001 | Frohlund | 16/330 |
| 6,530,121 B2 * | 3/2003 | Hayashi | 16/330 |
| 6,543,088 B2 * | 4/2003 | Koshikawa | 16/303 |
| 6,658,699 B2 * | 12/2003 | Huong | 16/330 |
| 6,789,292 B2 * | 9/2004 | Oshima et al. | 16/297 |

FOREIGN PATENT DOCUMENTS

| | | |
|---|---|---|
| JP | 07-011831 A | 1/1995 |
| JP | 10-019017 A | 1/1998 |
| JP | 10317779 | 12/1998 |
| JP | 11050727 | 2/1999 |
| JP | 11-193814 A | 7/1999 |
| JP | 2000337008 | 12/2000 |
| JP | 2001-152728 A | 6/2001 |

* cited by examiner (A)

(B)

(C)

(D)

(E)

(A)

(B)

(C)

(D)

HINGE DEVICE AND CELL PHONE

TECHNICAL FIELD

This invention relates to a hinge assembly capable of generating a click sound in a predetermined turning position.

BACKGROUND ART

In general, a hinge assembly used of a cellular telephone has a first and a second hinge member. The first and second hinge members are turnably connected to a transmission section and a reception section of the cellular telephone and are also connected to each other through a hinge pin. By this, the transmission section and reception section of the cellular telephone are turnably connected to each other.

The first and second hinge members are abutted against each other through bias means such as a coiled spring or the like. FIGS. 13(A) and 13(B) show abutment surfaces of the first and second hinge members 1, 2. The abutment surface of the first hinge member 1 has three fitting recesses 1a, 1b, 1c each having a generally trapezoidal configuration in section and arranged in predetermined positions in the circumferential direction. An abutment surface of the second hinge member 2 has two fitting projections 2a, 2b formed thereon. Those two fitting projections 2a, 2b are, when, for example, the transmission section and the reception section are turned to a closed position, fitted respectively into the fitting recesses 1a, 1b as shown in FIG. 13(C). Then, a biasing force of the bias means is converted into a force for turning the first and second hinge members 1, 2 by slant surfaces (force conversion mechanism) of the fitting recesses 1a, 1b and fitting projections 2a, 2b. This turning force causes the transmission section and the reception section to turn at a high speed and collide with each other vigorously. As a result, a click sound is generated. When the transmission section and the reception section are turned into an open position, the fitting projections 2a, 2b are fitted respectively into the fitting recesses 1c, 1a and the transmission section and the reception section are collided with each other. By this, a click sound is generated (see Japanese Patent Application Laid-Open No. H07-11831).

In the above-mentioned conventional hinge assembly, when the transmission section and the reception section are turned into the closed or open position, i.e., when the fitting projections 2a, 2b are fitted respectively into the fitting recesses 1a, 1b (1c, 1a), if the transmission section and the reception section are turned at a low speed against the biasing force of the bias means, the transmission section and the reception section are merely contacted with each other and they are never collided with each other vigorously. Thus, no click sound is generated.

The present applicant has proposed a hinge assembly capable of solving the above problem in Japanese Patent Application No. H11-376023. In that hinge assembly, a movable member is non-turnably but movably connected to a first hinge member and the movable member is abutted against a second hinge member by a coiled spring (bias means). Abutment surfaces of the movable member and the second hinge member have a fitting projection and a fitting recess formed thereon. A second hinge member and a reception section (or transmission section) are provided with an abutment projection and an abutment recess into which the abutment projection can be fitted. As the abutment projection is fitted into the abutment recess, the second hinge member turns following turning movement of the reception section. However, a width of the abutment recess in the circumferential direction is set slightly larger than a width of the abutment projection in the circumferential direction. Accordingly, the second hinge member can turn by a fine angle relative to the reception section.

In the hinge assembly thus constructed, when the reception section is turned into the closed position or open position and the fitting projection is fitted into the fitting recess, the second hinge member is caused to turn rapidly relative to the reception section by the biasing force of the bias means. As a result, a side surface of the abutment projection in the circumferential direction is abutted with a side surface of the abutment recess in the circumferential direction to thereby generate a click sound. In this case, the second hinge member, when the fitting projection is fitted into the fitting recess, is turned at a high speed relative to the reception section irrespective of the turning speed of the transmission section and reception section. Accordingly, even if the transmission section and reception section are turned at a low speed, a click sound can be generated.

However, in the hinge assembly of the above-mentioned patent application, it is necessary that the transmission section and reception section are provided with the abutment recess or abutment projection for generating a click sound. This gives rise to such a problem that it is unknown whether a click sound can actually be generated until the hinge assembly is attached to transmission section or reception section. Therefore, there is such a possibility that a click sound is not generated due to dimensional error or the like, or a click sound, if generated, is very small.

DISCLOSURE OF INVENTION

The present invention has been accomplished in order to solve the above problem. It is, therefore, an object of the present invention to provide a hinge assembly in which a click sound can surely be generated by the hinge assembly itself. In order to achieve this object, according to a first aspect of the invention, there is provided a hinge assembly comprising a first and a second hinge member turnably connected to each other through a hinge pin, a movable member into which the hinge pin between the first and second hinge member is turnably inserted and which is connected to the first hinge member such that the movable member is unable to turn about the hinge pin but able to move in an axial direction of the hinge pin, a hammer member into which the hinge pin between the movable member and the second hinge member is turnably inserted, and bias means for urging the movable member against the hammer member, a force conversion mechanism being disposed between contact surfaces of the movable member and hammer member and adapted to convert a biasing force of the bias means to a force for turning the hammer member, an abutment projection and an abutment recess being formed at the second hinge member and hammer member, the abutment projection and the abutment recess, when engaged with each other, causing the hammer member to turn following movement of the second hinge member, a width of the abutment recess in a circumferential direction being set larger than a width of the abutment projection in a circumferential direction.

According to a second aspect of the invention, there is also provided a cellular telephone having a transmission section and a reception section turnably connected to each other through a hinge assembly, wherein the hinge assembly comprises a first and a second hinge member turnably connected to each other through a hinge pin, a movable member into which the hinge pin between the first and second hinge member is turnably inserted and which is connected to the first hinge member such that the movable member is unable to turn about the hinge pin but able to move in an axial direction of the hinge pin, a hammer member into which the hinge pin between the movable member and the second hinge member is turnably inserted, and bias means for urging the movable member against the hammer member, a force conversion mechanism being disposed between contact surfaces of the movable member and hammer member and adapted to convert a biasing force of the bias means to a force for turning the hammer member, an abutment projection and an abutment recess being formed at the second hinge member and hammer member, the abutment projection and the abutment recess, when engaged with each other, causing the hammer member to turn following movement of the second hinge member, a width of the abutment recess in a circumferential direction being set larger than a width of the abutment projection in a circumferential direction, and the first hinge member being non-turnably connected to one of the transmission section and the reception section and the second hinge member being non-turnably connected to the other.

BRIEF DESCRIPTION OF DRAWINGS

FIG. 5(A) is a front view thereof, FIG. 5(B) is a side view thereof, FIG. 5(C) is a view when viewed in a direction as indicated by an arrow C of FIG. 5(A), FIG. 5(D) is a view when viewed in a direction as indicated by an arrow D of FIG. 5(B), and FIG. 5(E) is a sectional view taken on line E—E of FIG. 5(C).

FIG. 6(A) is a front view thereof, FIG. 6(B) is a side view thereof, FIGS. 6(C) and 6(D) are views when viewed in a direction as indicated respectively by an arrow C and an arrow D of FIG. 6(A), and FIG. 6(E) is a sectional view taken on line E—E of FIG. 6(C).

FIG. 7(A) is a plan view thereof, FIG. 7(B) is a front view thereof, FIG. 7(C) is a bottom view thereof, and FIG. 7(D) is a sectional view taken on line D—D of FIG. 7(A).

FIG. 8(A) is a plan view thereof, FIG. 8(B) is a side view thereof, FIG. 8(C) is a front view thereof, FIG. 8(D) is a sectional view taken on line D—D of FIG. 8(A), FIG. 8(E) is a bottom view thereof, and FIG. 8(F) is a sectional view taken on line F—F of FIG. 8(A).

FIGS. 13(A) and 13(B) are views showing opposing surfaces of the one pair of hinge members, and FIG. 13(C) is a sectional view taken on line C—C of FIG. 13(A), in which the one pair of hinge members are in opposing relation.

BEST MODE FOR CARRYING OUT THE INVENTION

One mode for carrying out the present invention will be described hereinafter with reference to FIGS. 1 through 12.

Figure 1:
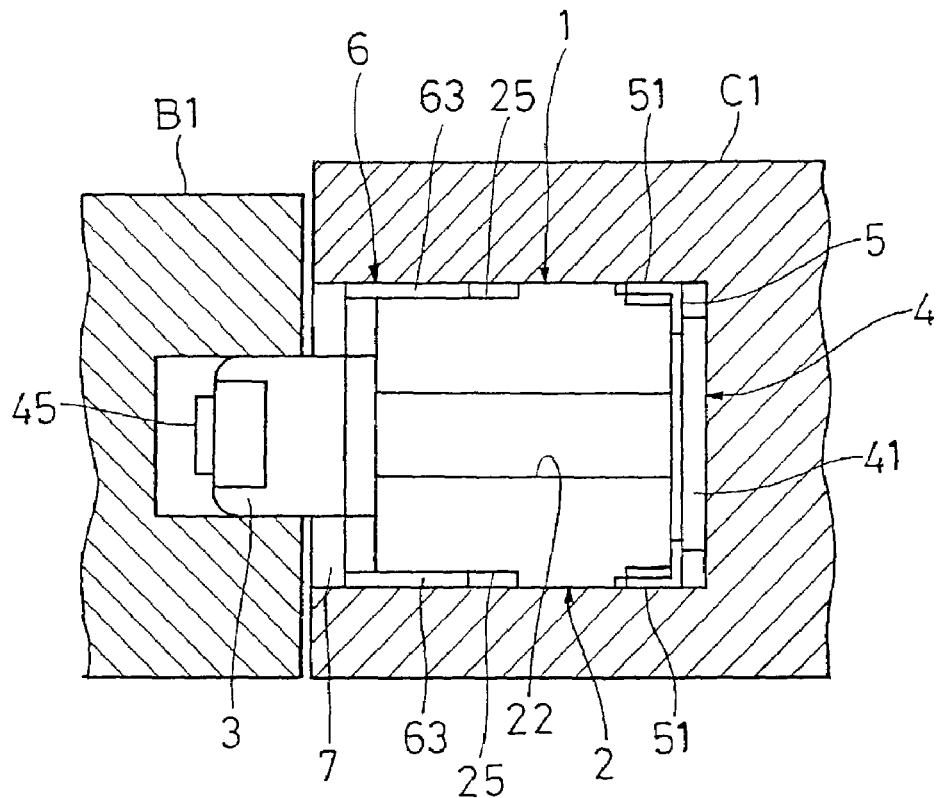
FIG. 1 is a view showing an important part of a cellular telephone according to the present invention and is an enlarged sectional view of a circular portion indicated by X of FIG. 10.
Figure 2:
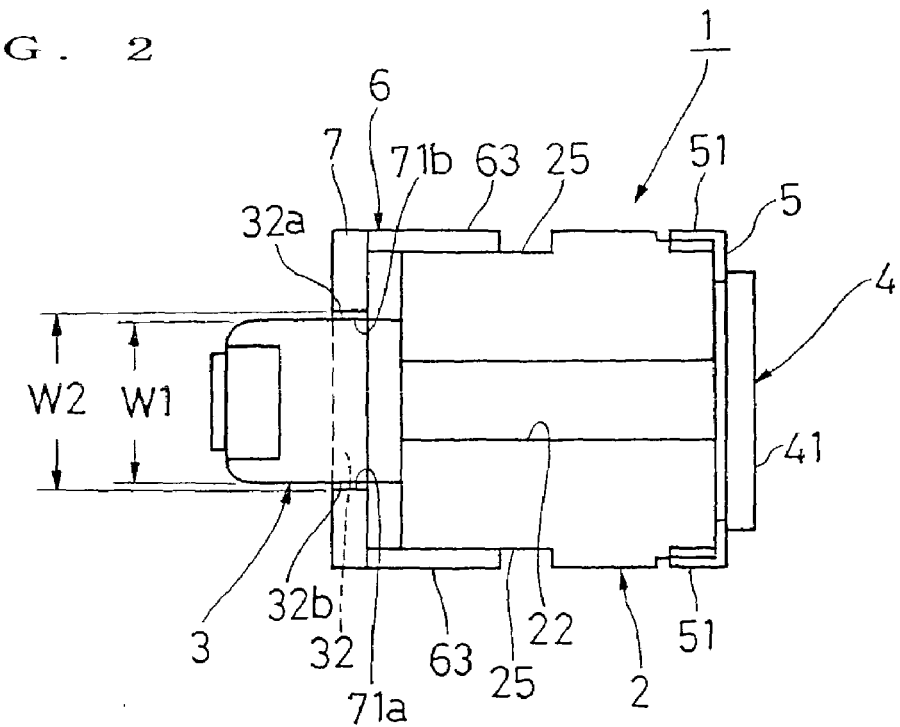
FIG. 2 is a front view showing a hinge assembly according to the present invention used in the above cellular telephone.
Figure 3:
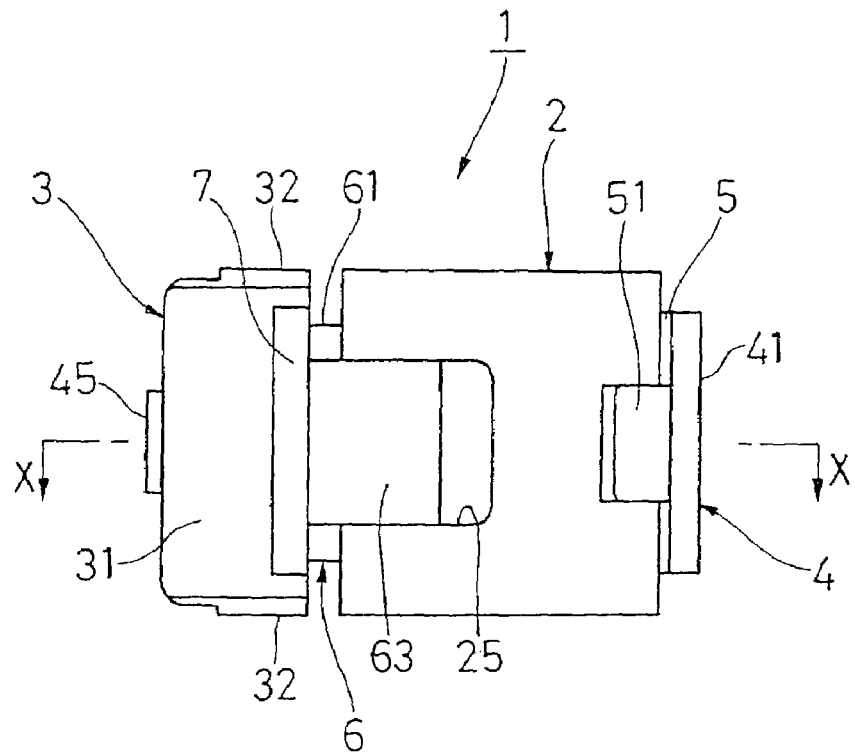
FIG. 3 is a plan view of the above hinge assembly.
Figure 10:
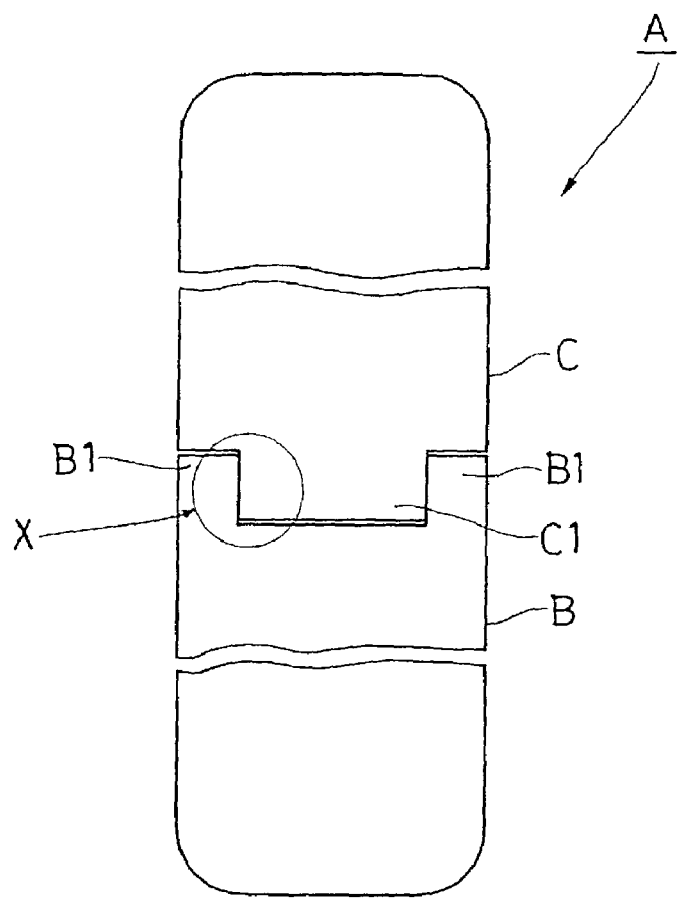
FIG. 10 is a plan view showing one example of a cellular telephone according to the present invention, which is in an open position.
Figure 11:
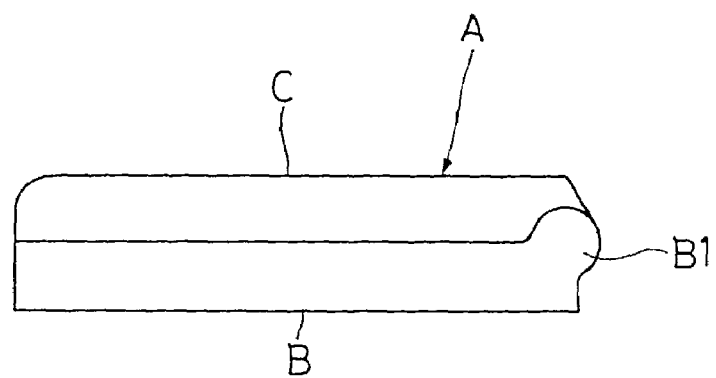
FIG. 11 is a side view showing the above cellular telephone, which is in a closed position.
Figure 12:
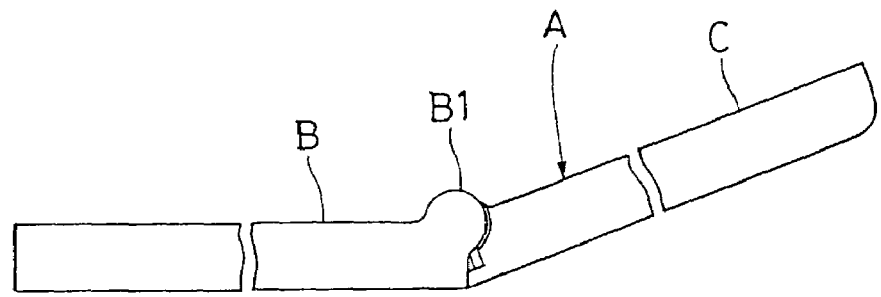
FIG. 12 is a side view showing the above cellular telephone, which is in an open position.
Figure 13:
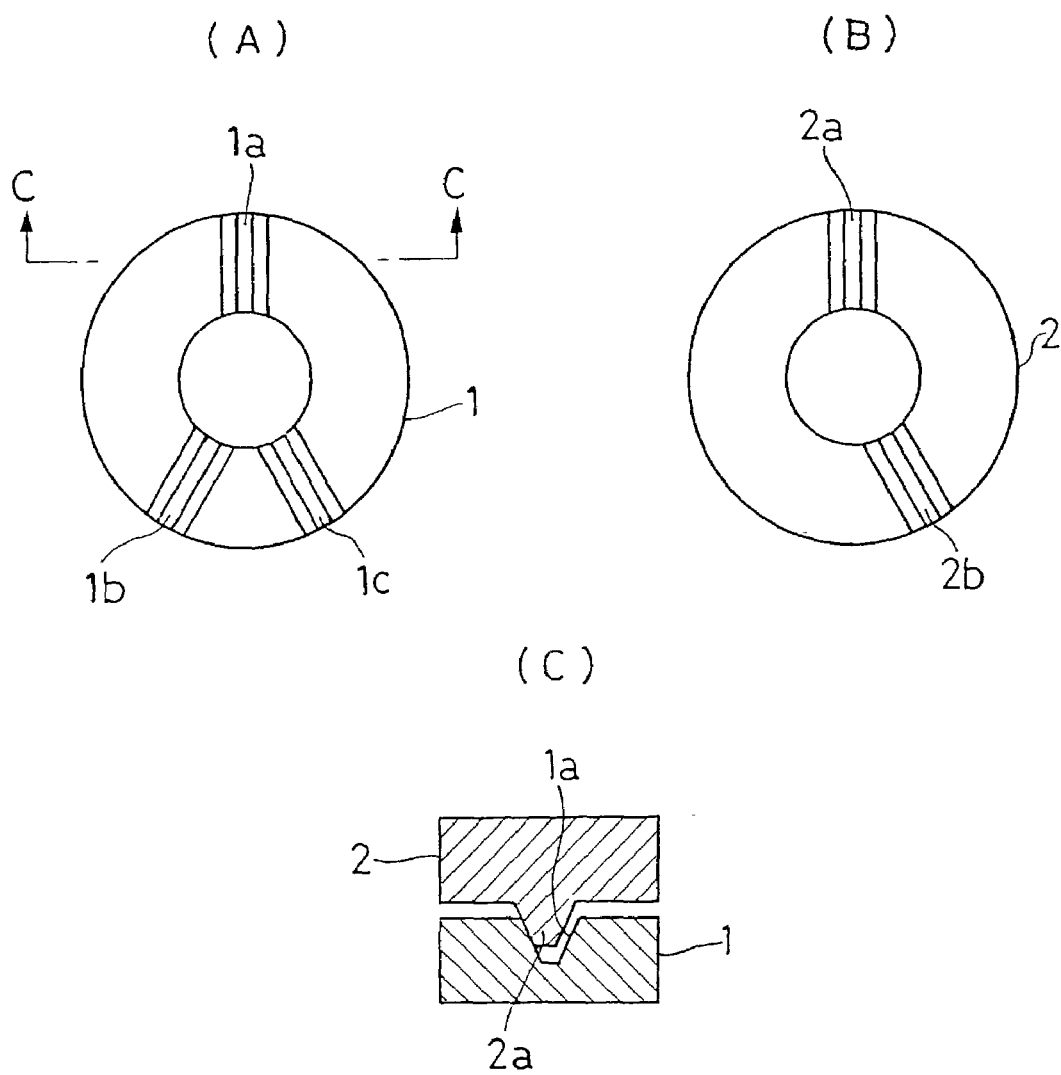
FIG. 13 is an illustration showing one pair of hinge members in a conventional hinge assembly.

FIGS. 10 through 12 show a cellular telephone A in which a hinge assembly according to the present invention is used. The cellular telephone A includes a transmission section B and a reception section C which are formed by shaping a thin plate of metal into a proper configuration. Connection cylinder parts B1, B1 are formed on opposite sides of one end part of the transmission section B. Each of the connection cylinder parts B1, B1 is open at a mutually opposing inner end part and closed at an outer end part. One end part (this end part is hereinafter referred to as the "distal end part" and the other end part as the "basal end part") of a hinge assembly 1 is, as shown in FIG. 1, fitted to each connection cylinder part B1. A connection cylinder part C1 is formed on a central area of one end part of the reception section C. The connection cylinder part C1 is open at opposite end parts thereof and arranged between the connection cylinder parts B1, B1 such that the connection cylinder part C1 is axially aligned with the connection cylinder parts B1, B1. The basal end part of each hinge assembly 1, 1 is, as shown in FIG. 1, non-turnably fitted to opposite end parts of the connection cylinder part C1. The distal end part fitted to the connection cylinder part B1 of the hinge assembly 1 and basal end part fitted to the connection cylinder part C1 are mutually turnably connected as later described. Accordingly, the transmission section B and the reception section C are turnably connected through the hinge assembly 1 about an axis (rotation axis of the hinge assembly 1) of the connection cylinder parts B1, C1. The transmission section B and the reception section C are able to turn between a closed position, as shown in FIG. 11, where they are abutted with each other and an open position, as shown in FIG. 12, where they are turned by a predetermined angle (for example, about 160 degrees to 170 degrees) from the closed position.

Figure 4:
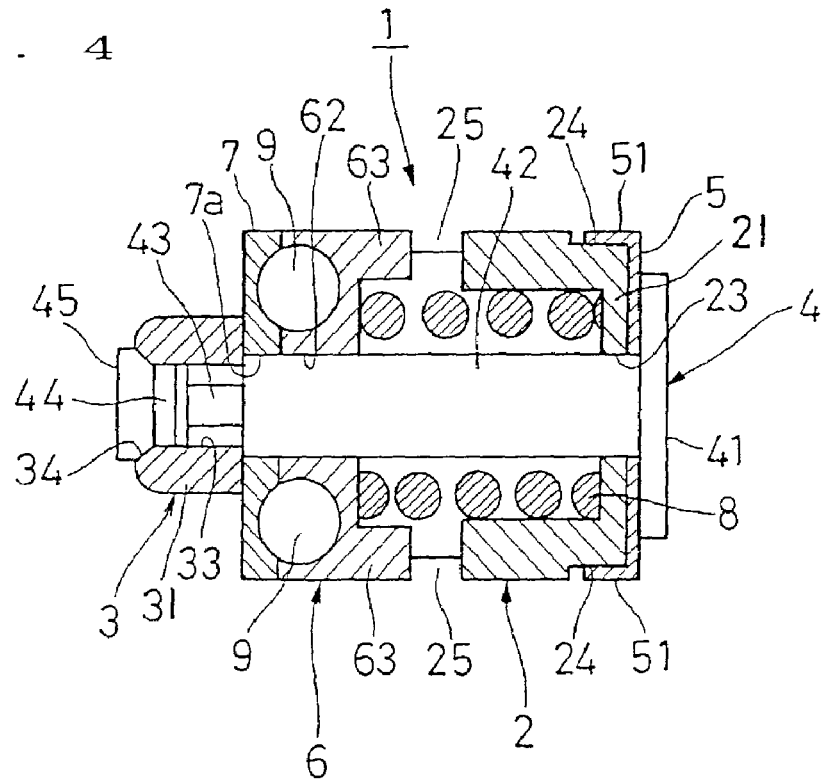
FIG. 4 is a sectional view taken along line X—X of FIG. 3.
Figure 5:
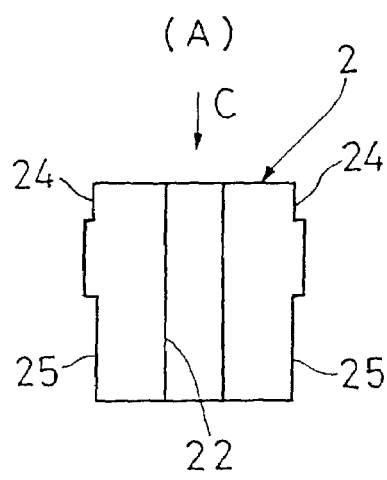
FIG. 5 is an illustration showing a first hinge member of the above hinge assembly.
Figure 5:
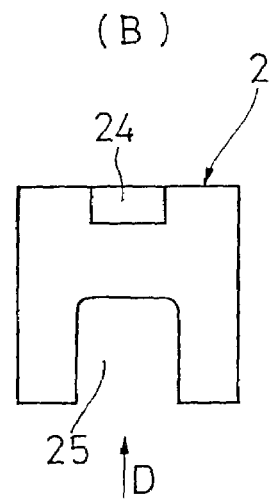
Figure 5:
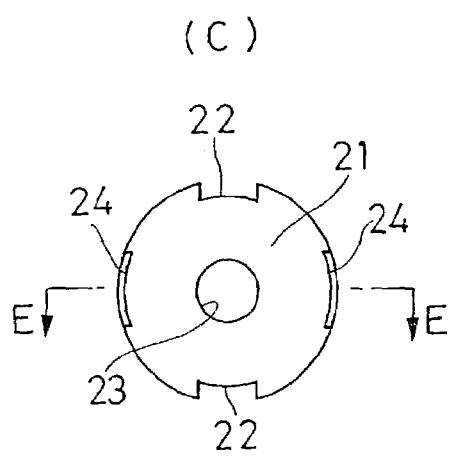
Figure 5:
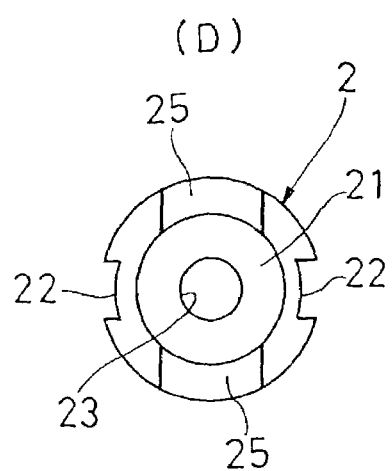
Figure 5:
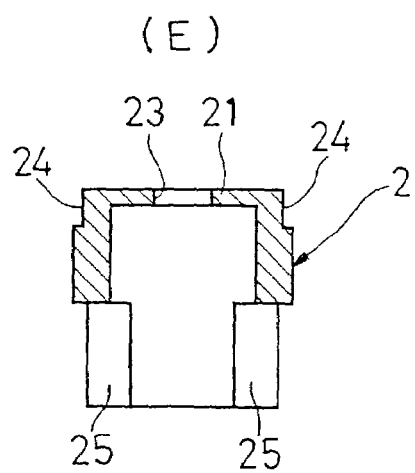

The hinge assembly 1 will be described next. As shown in FIGS. 1 through 4 and 9, the hinge assembly 1 comprises a first and a second hinge member 2, 3 and a hinge pin 4. The first hinge member 2 is in the form of a cylinder which is, as shown in FIG. 5, open at a distal end part (a lower end part of FIG. 5) and has a bottom part 21 at a basal end part. The first hinge member 2 is inserted into the connection cylinder part C1. An outer periphery of the first hinge member 2 has two key grooves 22, 22 which extend all the way from one end of the first hinge member 2 to the other end and which are arranged 180 degrees away from each other in the circumferential direction. A key portion (not shown) formed on an inner peripheral surface of the connection cylinder part C1 is fitted into each key groove 22. By this, the first hinge member 2 is non-turnably connected to the connection cylinder part C1 and hence non-turnably connected to the reception section C.

Figure 9:
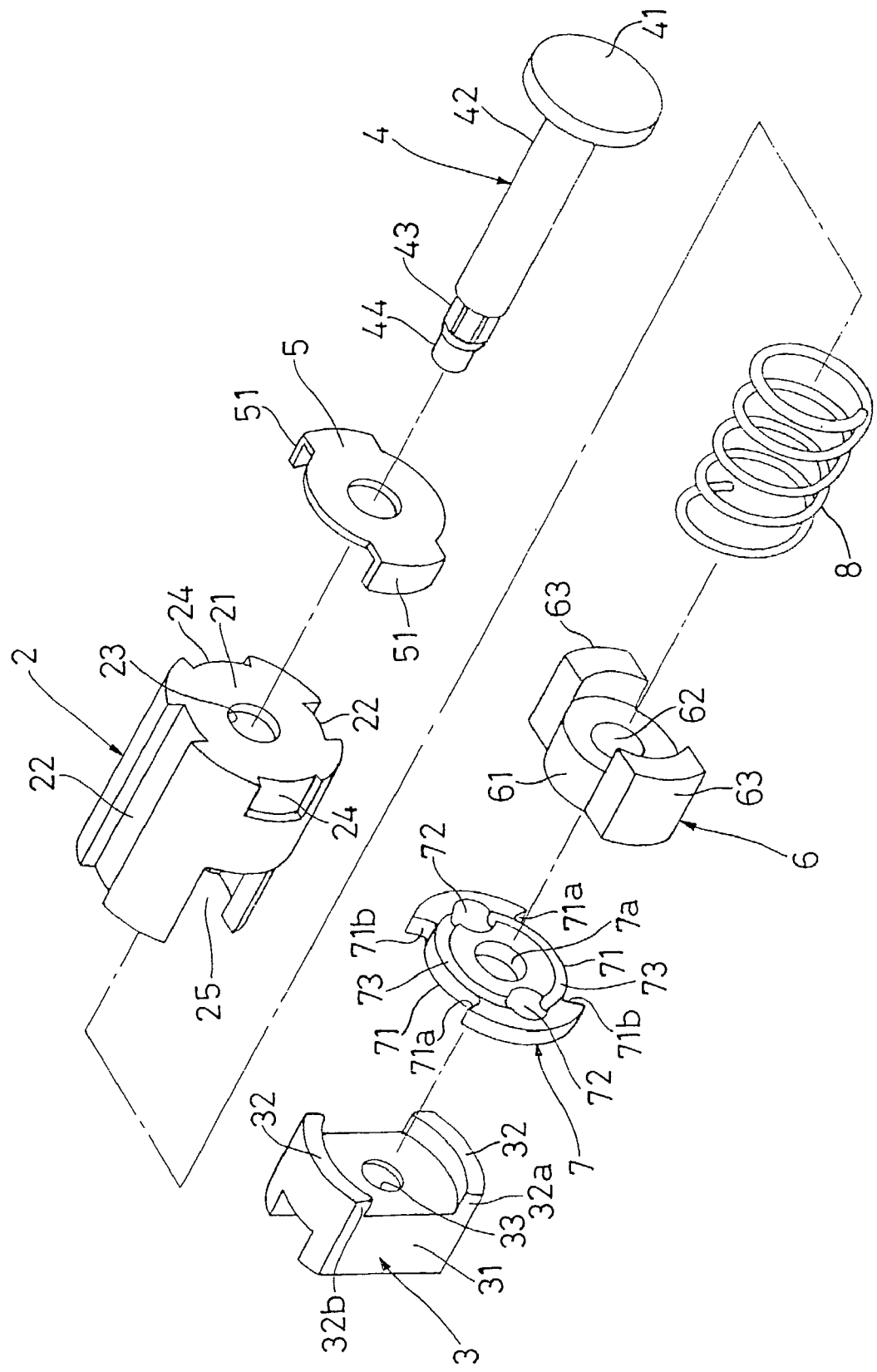
FIG. 9 is an exploded perspective view of the above hinge assembly.

The hinge pin 4 is made of metal. The hinge pin 4 comprises, as shown in FIGS. 4 and 9, a disc-like head part 41 formed on the basal end part, a circular support shaft part 42 in section formed on a central area of the head part 41, a hexagonal engagement shaft part 43 in section formed on a distal end face of the support shaft part 42, and a caulk part 44 formed on a distal end face of the engagement shaft part 43. The head part 41, support shaft part 42, engagement shaft part 43 and caulk part 44 are formed with their axes aligned. A diagonal dimension of the engagement shaft part 43 is set smaller than an outside diameter of the support shaft part 42. An outside diameter of the caulk part 44 is set to be almost equal to a distance between opposing two sides of the engagement shaft part 43. The support shaft part 42 is turnably inserted into a through hole 23 formed in a bottom part 21 of the first hinge member 2.

Figure 8:
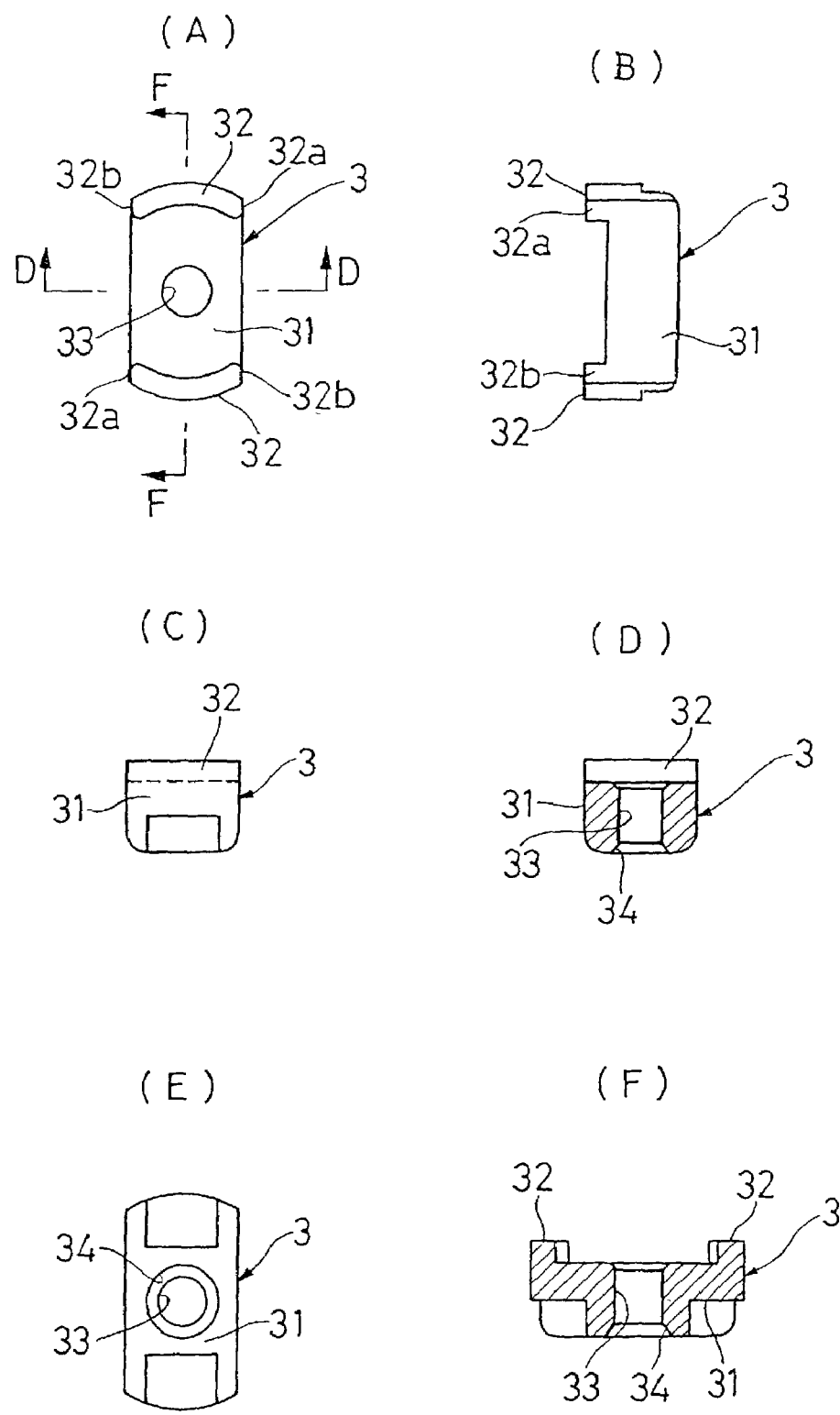
FIG. 8 is an illustration showing a second hinge member of the above hinge assembly.

The second hinge member 3 is made of metal. As shown in FIG. 8, the second hinge member 3 has a generally rectangular substrate part 31. An abutment projection 32 is formed on each of longitudinal opposite end parts of the substrate part 31 such that the abutment projection 32 projects towards the first hinge member 2 side. This second hinge member 3 having such a configuration is non-turnably inserted into the connection cylinder part B1 of the transmission section B. By this, the second hinge member 3 is turned in unison with the transmission section B. Moreover, by being contacted with an inner peripheral surface of the connection cylinder part B1, the second hinge member 3 is electrically connected to the transmission part B.

A press-fit hole 33 is formed in a central area of the substrate part 31 of the second hinge member 3 in such a manner as to extend all the way through the substrate part 31 in the thickness direction. Each corner part of the engagement shaft part 43 of the hinge pin 4 is press-fitted in the press-fit hole 33. By this, the second hinge member 3 is non-turnably connected to the hinge pin 4. Accordingly, the second hinge member 3 is turnably connected to the first hinge pin 2 through the hinge pin 4. A chamfer-like tapered hole part 34 is formed at an opening part of a distal end of the press-fit hole 33. As shown in FIG. 4, the caulk part 44 of the hinge pin 4 is caulked to form a configuration corresponding to that of the tapered hole part 34, thereby forming an enlarged-diameter part 45. The substrate part 31 is sandwichingly held by and between the enlarged-diameter part 45 and the distal end face of the support shaft part 42. By this, the second hinge member 3 is connected to the hinge pin 4 such that the second hinge member 3 is unable to move in the axial direction, and also electrically connected to the hinge pin 4.

A conductive member 5 is disposed between the bottom part 21 of the first hinge member 2 and the head part 41 of the hinge pin 4. This conductive member 5 is made of a metal plate. The support shaft part 42 is pierced into a central area of the conductive member 5 all the way therethrough. Moreover, the conductive member 5 is sandwichingly held by and between the bottom part 21 of the first hinge member 2 and the head part 41 of the hinge pin 4 and thereby, the conductive member 5 is fixed in place and electrically connected to the hinge pin 4. Opposite end parts of the conductive member 5 are each bent at right angles towards the second hinge member 3 side and terminated in a terminal part 51. This terminal part 51 is fitted into a recess 24 formed in an outer peripheral surface of the first hinge member 2. An outer surface of the terminal part 51 is slightly projected from the outer peripheral surface of the first hinge member 2. Accordingly, the terminal part 51 is surely contacted with the inner peripheral surface of the connection cylinder part C1 of the reception section C, and the conductive member 5 is electrically connected to the reception section C. As a result, the reception section C and the transmission section B are electrically connected to each other through the conductive member 5, the hinge pin 4 and the second hinge member 2. By this, antenna function of the hinge assembly 1 is enhanced and a counter-measure against static electricity is ensured.

As shown in FIG. 4, between the first hinge member 2 and the second hinge member 3, a movable member 6 is disposed on the first hinge member 2 side and a hammer member 7 is disposed on the second hinge member 3 side.

Figure 6:
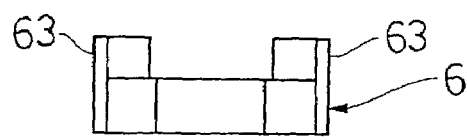
FIG. 6 is an illustration showing a movable member of the above hinge assembly.
Figure 6:
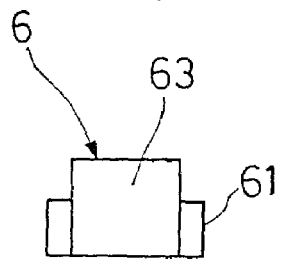
Figure 6:
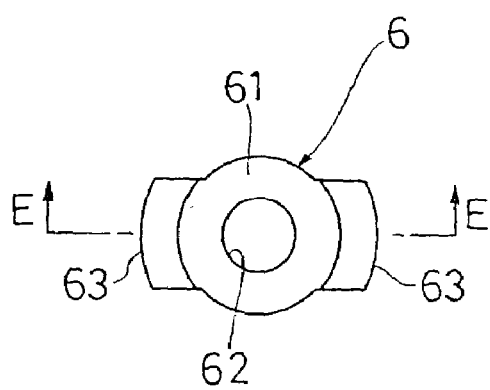
Figure 6:
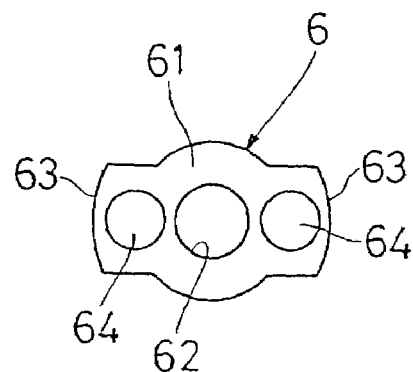
Figure 6:
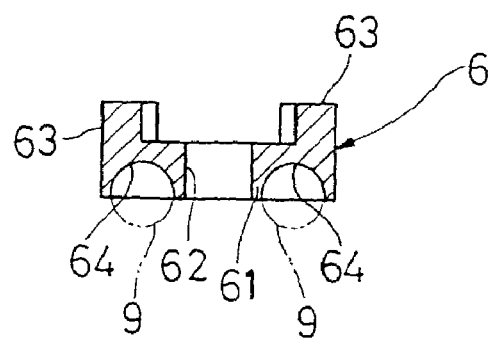

The movable member 6, as shown in FIG. 6, has a disc-like basal part 61. A through hole 62 is formed in a central area of the basal part 61. The support shaft part 42 of the hinge pin 4 is turnably and movably inserted into the through hole 62. Guide parts 63, 63 are formed on one and the other end parts of the basal part 61 of the movable member 6, the above one and the other end parts being 180 degrees away from each other in the circumferential direction. Those guide parts 63, 63 are fitted into guide grooves 25, 25 extending from the distal end face of the first hinge member 2 towards the basal end side such that the guide parts 63, 63 are able to move in the axial direction of the hinge assembly 1. By this, the movable member 6 is movably but non-turnably connected to the first hinge member 2.

Figure 7:
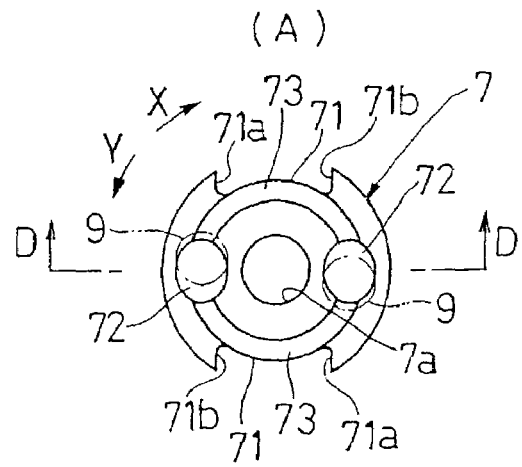
FIG. 7 is an illustration showing a hammer member of the above hinge assembly.
Figure 7:
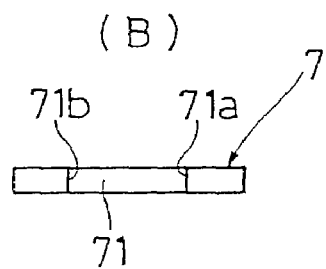
Figure 7:
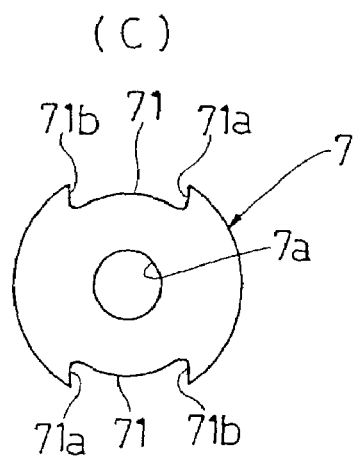
Figure 7:
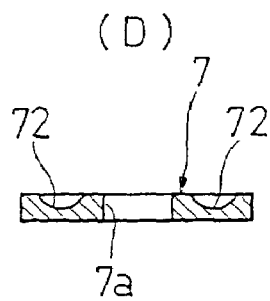

The hammer member 7, as shown in FIG. 7, has a circular flat plate-like configuration. A through hole 7a is formed in a central area of the hammer member 7. The support shaft part 42 of the hinge pin 4 is turnably and movably inserted into the through hole 7a. One pair of abutment recesses 71, 71 are formed in an outer peripheral surface of the hammer member 7 in such a manner as to be 180 degrees away from each other in the circumferential direction. The abutment projections 32, 32 of the second hinge member 3 are inserted into the abutment recesses 71, 71, respectively. By this, when the second hinge member 3 is turned, the hammer member 7 is turned following the movement of the second hinge member 3. It should be noted, however, that a width W2 of the abutment recess 71 in the circumferential direction is slightly larger than a width W1 of the abutment projection 32 in the circumferential direction. Accordingly, the hammer member 7 can slightly turn relative to the second hinge member 3 to the extent of the difference in width between the abutment recess 71 and the abutment projection 32.

A coiled spring (bias means) 8 is disposed between the bottom part 21 of the first hinge member 2 and the movable member 6. By this coiled spring 8, the movable member 6 is caused to abut against the hammer member 7 and the hammer member 7 is received by the substrate part 31 of the second hinge member 3. One pair of support recesses 64, 64, as shown in FIGS. 6(D), and 6(E) are formed in an abutment surface of the movable member 6 with respect to the hammer member 7 such that the one pair of support recesses 64, 64 are 180 degrees away from each other in the circumferential direction. A spherical body 9 as a fitting projection is turnably inserted in and supported by each support recess 64.

As shown in FIG. 7, one pair of fitting recesses 72, 72 are formed in a confronting surface of the hammer member 7 with respect to the movable member 6 in such a manner as to be 180 degrees away from each other in the circumferential direction. The one pair of fitting recesses 72, 72 are arranged on a same circumference as that of the support recesses 64, 64 (spherical bodies 9, 9). When the reception section C is turned into the closed position, the center of the spherical body 9 is located between the center of curvature of the fitting recess 72 and a peripheral edge part thereof as indicated by an imaginary line of FIG. 7(A). Accordingly, when the reception section C is located in the closed position, the spherical body 9 is contacted with a slant surface forming a part of the bottom surface which defines the fitting recess 72. As a result, the biasing force of the coiled spring 8 is converted into a force for biasing the spherical body 9 in a direction as indicated by an arrow Y, in other words, into a rotational biasing force for turning the hammer member 7 in a direction as indicated by an arrow X. By this rotational turning force, the second hinge member 3 and the reception section C are pushed in a same direction (in a direction from the open position side towards the closed position side) and the reception section C is held in the closed position. On the other hand, when the reception section C is turned to the open position, the spherical body 9 is moved to a position which is point symmetrical to a position indicated by an imaginary line of FIG. 7. As a result, the hammer member 7 is rotationally biased in a direction indicated by an arrow Y of FIG. 7 and hence, the second hinge member 3 and the reception section C are biased in a direction from the closed position side towards the open position side. By this, the reception section C is held in the open position. As apparent from the foregoing, the force conversion mechanism is comprised of the fitting recess 72 and the spherical body 9. Guide grooves 73, 73 are formed between the one pair of fitting recesses 72, 72. When the reception section C is turned between the closed position and the open position, the spherical body 9 is rollingly moving within the guide groove 73.

Let's presume that in the hinge assembly 1 thus constructed, the reception section C is located between the closed position and the open position and turned in a direction (in the direction indicated by the arrow X of FIG. 7) from the open position side towards the closed position side. In that state, one side surface 32a of the abutment projection 32 of the second hinge member 3 is in collision with the side surface 71b of the abutment recess 71. Accordingly, a fine gap corresponding to the difference in width between the abutment projection 32 and the abutment recess 71 is formed between the other side surface 32b of the abutment projection 32 and the side surface 71a of the abutment recess 71. At that time, the spherical body 9 is rollingly relatively moving within the guide groove 93 in the direction indicated by the arrow Y. When the reception section C is brought to the closed position or to a position just before the closed position, the center of the spherical body 9, as indicated by an imaginary line of FIG. 7, is located between a peripheral edge part of the fitting recess 72 and the center of curvature thereof and the spherical body 9 is collided against the slant surface forming a part of the wall surface which defines the fitting recess 72. As a result, the biasing force of the coiled spring 8 is converted into a rotational biasing force for pushing the hammer member 7 in the direction indicated by the arrow X. At that time, since the hammer member 7 is able to turn by a fine angle relative to the second hinge member 3, the hammer member 7 is turned at a high speed in the direction indicated by the arrow X by the rotational biasing force. As a result, the side surface 71a of the abutment recess 71 of the hammer member 7 is brought into collision with the side surface 32b of the abutment projection 32b at a high speed. By this, a click sound is generated. Moreover, by collision of the side surface 71a against the side surface 32b, the second hinge member 3 is pushed in the X-direction by the coiled spring 8 and the reception section C is held in the closed position.

In the case where the reception section C is turned from the closed position side towards the open position side, when the reception section C is brought to the open position or to a position just before the open position, the hammer member 7 is rapidly turned in the Y-direction and the side surface 71b of the abutment recess 71 is bought into collision with the side surface 32a of the abutment projection 32. By this, a click sound is generated. Moreover, since the side surface 71b is brought into collision with the side surface 32a, the second hinge member 8 is biased in the Y-direction and the reception section C is held in the open position.

It should be noted that the present invention is not limited to the above embodiment. Instead, many changes and modifications can be made in accordance with necessity.

For example, in the above embodiment, although the hinge assembly 1 according to the present invention is applied to the cellular telephone A, it can likewise be applied to other devices such as, for example, a notebook type personal computer and the like.

Similarly, in the above embodiment, although the spherical body 9 as a fitting projection which forms a part of the force conversion mechanism is separately formed from the movable member 6, the fitting projection may be formed integrally with the movable member 6.

INDUSTRIAL APPLICABILITY

The hinge assembly according to the present invention can be used as a hinge assembly for turnably connecting a main body and a cover to each other of such devices as a cellular telephone, a personal computer and the like.

What is claimed is:

1. A hinge assembly comprising a first hinge member and a second hinge member, where said first hinge member and said second hinge member are not integrally formed from a body of a device and not integrally fanned from a cover of a device, said first hinge member being non-turnably inserted into one of connection cylinder parts which are formed on said body of the device and said cover of the device and said second hinge member being non-turnably inserted into the other, said first hinge member and second hinge member turnably connected to each other through a hinge pin, a movable member into which said hinge pin between said first and second hinge member is turnably inserted and which is connected to said first hinge member such that said movable member is unable to turn about said hinge pin but able to move in an axial direction of said hinge pin, a hammer member into which said hinge pin between said movable member and said second hinge member is turnably inserted, and bias means for urging said movable member against said hammer member, a force conversion mechanism being disposed between contact surfaces of said movable member and hammer member and adapted to convert a biasing force of said bias means to a force for turning said hammer member, an abutment projection and an abutment recess being formed at said second hinge member and hammer member, said abutment projection and said abutment recess, which engaged with each other, causing said hammer member to turn following movement of said second hinge member, a width of said abutment recess in a circumferential direction being set larger than a width of said abutment projection in a circumferential direction so that said hammer member can relatively turn by a small angle with respect to said second hinge member and said abutment projection can abut with a side surface of said abutment recess, by this a click sound is generated.

2. A cellular telephone having a transmission section and a reception section turnably connected to each other through a hinge assembly, wherein said hinge assembly comprises a first and a second hinge member that are not integrally formed from a transmission section of a cellular telephone and are not integrally formed from a reception section of a cellular telephone, said first hinge member and second hinge member being turnably connected to each other through a hinge pin, a movable member into which said hinge pin between said first and second hinge member is turnably inserted and which is connected to said first hinge member such that said movable member is unable to turn about said hinge pin but able to move in an axial direction of said hinge pin, a hammer member into which said hinge pin between said movable member and said second hinge member is turnably inserted, and bias means for urging said movable member against said hammer member, a force conversion mechanism being disposed between contact surfaces of said movable member and hammer member and adapted to convert a biasing force of said bias means to a force for turning said hammer member, an abutment projection and an abutment recess being formed at said second hinge member and hammer member, said abutment projection and said abutment recess, which engaged with each other, causing said hammer member to turn following movement of said second hinge member, a width of said abutment recess in a circumferential direction being set larger than a width of said abutment projection in a circumferential direction so that said hammer member can relatively tin by a small angle with respect to said second hinge member and said abutment projection can abut with a side surface of said abutment recess, by this a click sound is generated, and said first hinge member being non-turnably inserted into one of connection cylinder parts which are formed on said transmission section and said reception section and said second hinge member being non-turnably inserted into the other.

* * * * *

UNITED STATES PATENT AND TRADEMARK OFFICE
CERTIFICATE OF CORRECTION

PATENT NO. : 6,990,711 B2
DATED : January 31, 2006
INVENTOR(S) : Koshikawa et al.

It is certified that error appears in the above-identified patent and that said Letters Patent is hereby corrected as shown below:

Column 8,
Line 39, delete "fanned" and insert -- formed --.

Column 10,
Line 11, delete "tin" and insert -- turn --.

Signed and Sealed this

Fourth Day of April, 2006

JON W. DUDAS
*Director of the United States Patent and Trademark Office*